(12) United States Patent
Wilhelm

(10) Patent No.: US 7,760,655 B2
(45) Date of Patent: Jul. 20, 2010

(54) METHOD AND DEVICE FOR TRANSFER OF DATA OVER A DATA CONNECTION FROM A SENDER TO A RECEIVER BY MEANS OF PACKETS

(75) Inventor: Martin Wilhelm, Maitenbeth (DE)

(73) Assignee: Oce Printing Systems GmbH, Poing (DE)

( * ) Notice: Subject to any disclaimer, the term of this patent is extended or adjusted under 35 U.S.C. 154(b) by 467 days.

(21) Appl. No.: 11/615,085

(22) Filed: Dec. 22, 2006

(65) Prior Publication Data
US 2007/0147381 A1 Jun. 28, 2007

(30) Foreign Application Priority Data
Dec. 27, 2005 (DE) ........................ 10 2005 062 575

(51) Int. Cl.
*G06F 11/00* (2006.01)
*G06F 11/08* (2006.01)
(52) U.S. Cl. ................. 370/242; 370/216; 370/245; 370/389; 370/392; 370/546
(58) Field of Classification Search ................. 370/216, 370/242, 245, 389, 392, 546
See application file for complete search history.

(56) References Cited
U.S. PATENT DOCUMENTS
6,018,816 A 1/2000 Tateyama

| | | | |
|---|---|---|---|
| 6,880,035 B1 | 4/2005 | Groeger et al. | |
| 2002/0075842 A1* | 6/2002 | Ghosh et al. | 370/347 |
| 2003/0048781 A1* | 3/2003 | Pierson | 370/389 |
| 2003/0135640 A1* | 7/2003 | Ho et al. | 709/237 |
| 2004/0139244 A1* | 7/2004 | Hufferd | 710/30 |
| 2005/0169199 A1 | 8/2005 | Futenma et al. | |
| 2006/0034248 A1* | 2/2006 | Mishra et al. | 370/349 |
| 2007/0112994 A1* | 5/2007 | Sandven et al. | 710/310 |

FOREIGN PATENT DOCUMENTS
WO WO 00/22537 4/2000

OTHER PUBLICATIONS
OCE Printing Systems—The World of Printers Author: Dr. J. Jörgens Chapter 10—The SRA Controller—Nov. 1998.

* cited by examiner

*Primary Examiner*—Dang T Ton
*Assistant Examiner*—Robert M Morlan
(74) *Attorney, Agent, or Firm*—Schiff Hardin LLP

(57) ABSTRACT

In a method and device for transfer of data over a data connection from a transmitter to a receiver by means of packets, repetition packets with respect to predetermined packets are transmitted given free transfer capacity The packets and their corresponding repetition packets comprise an identifier by use of which the receiver can identify the packets. Given a faulty transfer of a packet, the receiver can identify this quickly via the provision of the repetition packets and can introduce corresponding countermeasures This method is in particular provided for serial high-capacity data connections in which a faulty transfer of individual packets cannot be precluded in principle.

18 Claims, 11 Drawing Sheets

METHOD AND DEVICE FOR TRANSFER OF DATA OVER A DATA CONNECTION FROM A SENDER TO A RECEIVER BY MEANS OF PACKETS

BACKGROUND

The preferred embodiment concerns a method and a device for transfer of data over a data connection from a sender to a receiver by means of packets. The preferred embodiment in particular concerns such a method for supply of data to a machine (such as, for example, a high-capacity printer) to which a data stream must be supplied on an ongoing basis with high capacity.

There are diverse machines that must be supplied with a large data stream in operation. One such a machine is, for example, a high-capacity printer to which print data must be supplied on an ongoing basis. The capacity of control devices that process a large data stream in order to feed it to a high-capacity printer must be increased on an ongoing basis since an increasingly improved print quality requires an increased data quantity or data set. The transition from black-and-white printing to color printing thus incurs a multiplication of the data quantity. An increase of the resolution also means a multiplication of the data set. Both the requirements for the color and for the resolution continuously increase.

High-capacity printers thus represent machines to which an extraordinarily large data stream must be supplied. Given a printer that, for example, prints 400 DIN A3 pages per minute in black-and-white with a resolution of 600 dpi, a data stream with approximately 560 Mbytes/s is required. The data stream must be supplied to the printer without errors or else expensive waste is produced. The method for transfer of the data must therefore on the one hand be very fast and on the other hand be very reliable.

In "Das Druckerbuch"—Technik und Technologie der Hochleistungsdrucker von Océ Printing Systems GmbH—Drucktechnologien", Edition 3c, May 1998, ISBN 3-00-001019-X, a control device designated as an "SPA Controller" (SRA: Scalable Raster Architecture) is described for control of a high-capacity printer.

The design of this known control device is schematically shown in FIG. 1. Such a control device 1 comprises an I/O module 2, one or more raster modules 3 and a serializer module 4. The individual modules 2 through 4 are connected with one another via a parallel data bus 5. The raster modules 3 and the serializer module 4 are connected with one another via a further pixel bus 6. A print head of a high-capacity printer 7 is connected to the serializer module 4.

The I/O module 2 receives the print information from a control device that can be a mainframe system or also a computer network. The print information is relayed from the I/O module 2 to the raster modules 3 and the serializer module 4, whereby the raster modules 3 receive the print image information and convert it into a print image data stream that can be processed by the print head 7. These print image data streams are transferred from the raster modules 3 via the pixel bus 6 to the serializer module 4 that strings the data streams in a predetermined order and relays them to the print head 7.

The data bus is, for example, a Multibus II (Multibus is a registered trademark of Intel Corp.). The Multibus II is a synchronized bus that is established in the IEEE Standard for a High Performance Synchronous 32-Bit Bus: Multibus II, The Institute of Electrical and Electronics Engineers, Inc., 345 East 47$^{th}$ Street, NY 10017, USA, 1998. In the following the "MULTIBUS II" is designated in a simplified manner as "Multibus".

The modules 2 through 4 of the control device 1 are respectively provided with a processor. In systems based on the Multibus, an inter-processor communication occurs via a message exchange (message transfer), whereby messages with data packets with a predetermined length are transmitted for transfer of data.

In WO 00/22537 an electronic control device is described that comprises a parallel data bus and a plurality of modules respectively provided with a processor, and a development of the control device explained using FIG. 1 is presented. The modules communicate via the data bus. The modules respectively comprise a processor and a storage device and are connected with the data bus by means of a bus controller. The data are transferred between sender modules and a receiver module by mans of messages.

This device is characterized in that the bus controller of the sender module is designed such that it reads data stored in the storage device of the sender module without usage of the processor of the sender module for a request message to the receiver module and sends said data to the receiver module. The receiver module thus initiates an automatic transfer due to its request message in the sender module. This leads to a significant unburdening of the sender module since the data can be directly read out significantly more quickly and effectively by means of a DMA controller and the processor is not long occupied by such a data transfer. The "negotiation" described above that comprises three message transmissions (see FIG. 2) in the conventional Multibus is additionally reduced to the transmission of a single request message, whereby a further simplification and acceleration of the transfer procedure is achieved.

In the control devices described above the data are transferred over a parallel data bus, In the past parallel data connections were significantly more reliable and stable than serial data connections with similar transfer capacity. The transfer capacity of parallel data connections could additionally be increased more simply in comparison to serial data connections. There are various industry standards for serial data connection such as, for example, IEEE 802.3-1985 from the year 1985, which describes the 10 Mbyte/s Ethernet standard, IEEE 802.3x-1997 and IEEE 802.3y-1997 from the year 1997 that describe the further development of the IEEE 802.3-1985 standard to 100 Mbyte/s and, for example, IEEE 802.3z-1998 from the year 1998 that represents a further development to 1,000 Mbyte/s.

The transfer capacity of serial data connections has increasingly risen in recent years such that they exceed distinctly parallel data connections with their transfer capacity. Such a typical serial data connection is the USE bus, which is in particular used in the connection between peripheral apparatuses and computers. In usage in industrial applications such as control devices for supply of a large data stream to a print head, such serial data connections were previously not used at all or barely used since they are relatively unstable and the error correction methods hereby used decrease the effective data rate relative to a theoretically-possible data rate such that they appear unsuitable for a continuous usage.

Errors in the data transfer are in particular established by means of what are known as "timeout counters" that measure a certain time span and, when the data transfer has not been successfully executed within this time span, it is restarted. The time span measured by the timeout counter is thus lost for the data transfer. The time span to be set by the timeout counter cannot be arbitrarily shortened because otherwise the danger would exist that, in spite of a correct data transfer, the time span would elapse and the transfer process would be restarted. The use of timeout counters to avoid a malfunction, in particular to avoid what is known as a dead state in which the function of the data transfer completely fails, is therefore principally connected with a significant capacity less when the data connection is not operated almost absolutely without faulty transfer, which is in principle not possible given serial data connections.

SUMMARY

It is an object to achieve a method for transfer of data to a machine that, even given a serial data connection, must use a timeout mechanism significantly less or even not at all in comparison to conventional methods. It is also an object to achieve a corresponding device for transfer of data over a data connection from a sender to a receiver by means of packets.

In a method or device for transfer of data over a data connection from a transmitter to a receiver by use of packets that comprise an identifier by use of which the receiver can identify the respective packet, given a free transfer capacity of the data connection the transmitter sends one or more repetition packets with respect to a transferred packet. The repetition packets comprise an identifier of the transferred packet. With the receiver discarding incorrectly received packets and, given a faulty transfer, either identifying a faulty transferred packet using the one or more repetition packets, or using the one or more repetition packets in place of the faulty transferred packet for further data transfer.

DESCRIPTION OF THE PREFERRED EMBODIMENT

Figure 1:
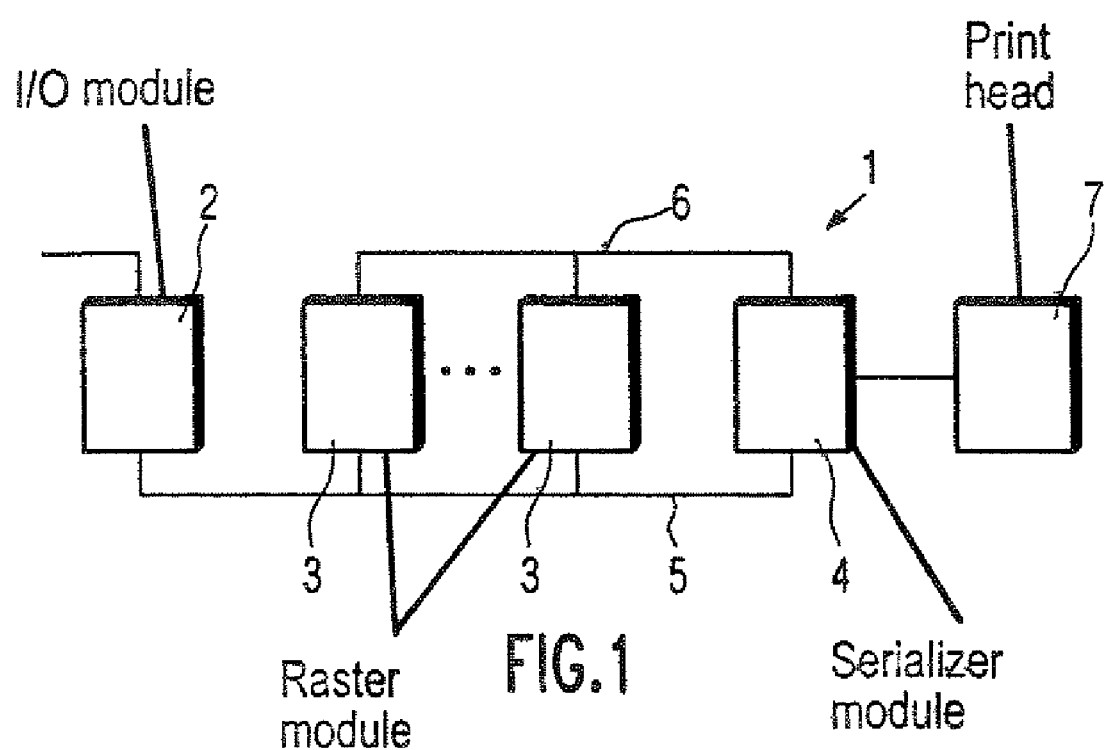
FIG. 1 illustrates an underlying design of a control device for preparation of print data for a high-capacity printer in a bock diagram according to the prior art.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Figure 2:
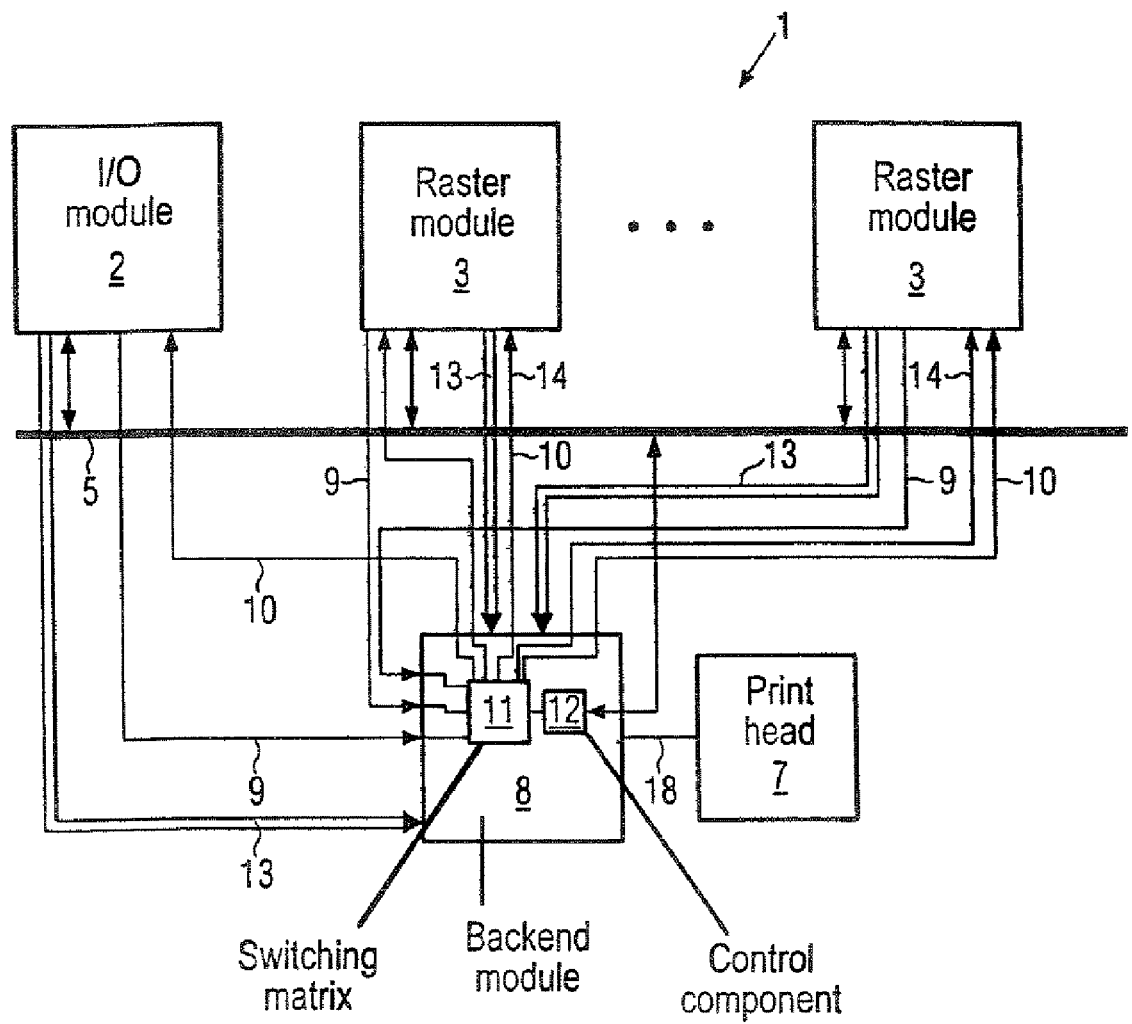
FIG. 2 shows a plurality of modules that are connected with one another via a Multibus and high-speed data connections.

In specific data connections, in particular serial data connections, it cannot be avoided that individual packets are faulty. Due to the transmission of repetition packets given a free transfer capacity, delay times in the data transfer are avoided since, on the one hand, faulty packets can be identified immediately or the repetition packets can be used instead of faulty packets for the further execution of the data transfer. The efficiency of the data transfer is hereby significantly increased in a simple manner The preferred embodiment is explained using an electronic control device 1 for controlling a print head that exhibits the design shown in FIG. 2.

The preferred embodiment is a development of the electronic control device known from WO 00/22537 and the method described therein for operation of the control device. WO 00/22537 is therefore incorporated by reference into the present patent application.

The control device comprises an I/O module 2, one or more raster modules 3 and a backend module 8. A print head 7 is connected to the backend module.

The individual modules 2, 3, and 8 are connected with one another with a parallel data bus 5.

The I/O module 2 and the raster modules 3 are designed from the same component, which is why they are designated in the following as component modules. The design of these component modules is explained in detail below. At least two high-speed links 9, 10 are respectively provided for communication between the component modules 2, 3 and the backend module 8. The high-speed links are serial data lines, and in the present exemplary embodiment a signal clocked at 2.5 GHz is used for transfer of the data. A data transfer speed of 250 Mbyte/s per channel is hereby achieved.

The high-speed links are realized by means of multi-gigabit transfer drivers that are arranged at the end points of the data connection and are designated in the following as MGTs. Such an MGT is, for example, known under the commercial name RocketIO Transceiver (XILINX). The RocketIO transceiver is described in the RocketIO Transceiver User Guide (UG024(v. 1.5), Oct. 16, 2002).

The high-speed links 9 are designed for data transfer from the component modules 2, 3 to the backend module 8 and the high-speed links 10 are designed for data transfer from the backend module 8 to the component modules 2, 3.

Serial data channels 13 that respectively comprise four high-speed links for transfer of data from the component modules 2, 3 to the backend module 8 are provided for communication between the component modules 2, 3 and the backend module 8 for transfer of data from a component module 2, 3 to the print head 7. A single high-speed link 14 is respectively arranged in the opposite direction, which single high-speed link 14 transfers data from the backend module 8 to the component module 2, 3.

The provision of the data channels 13 serve in particular for transfer of the image data rastered in the raster modules 3, which image data represent the largest data stream to be transferred in the present control device.

The high-speed links 9, 10 of the serial data channel 13 and the high-speed links 14 are subsequently summarized with the term high-speed connections.

The backend module 8 comprises a passive switching matrix 11. The switching matrix 11 possesses an input side to which the high-speed links 9 and the data channels 13 are connected and an output side to which the high-speed links 10, 14 and the data lines leading to the print head 7 are connected. The switching matrix 11 is designed such that one input can respectively be connected with one output. At the same time a plurality of inputs can also be connected with a plurality of outputs. It is here also possible that a single input is connected with a plurality of outputs (broadcasting mode).

The switching matrix 11 is switched by a control component 12 (COSI). This control component 12 is a component of the backend module 8. The use of a passive switching matrix 11 allows extremely fast switching procedures such that even signals in the GHz range can be switched cleanly and a data loss is avoided.

Figure 5:
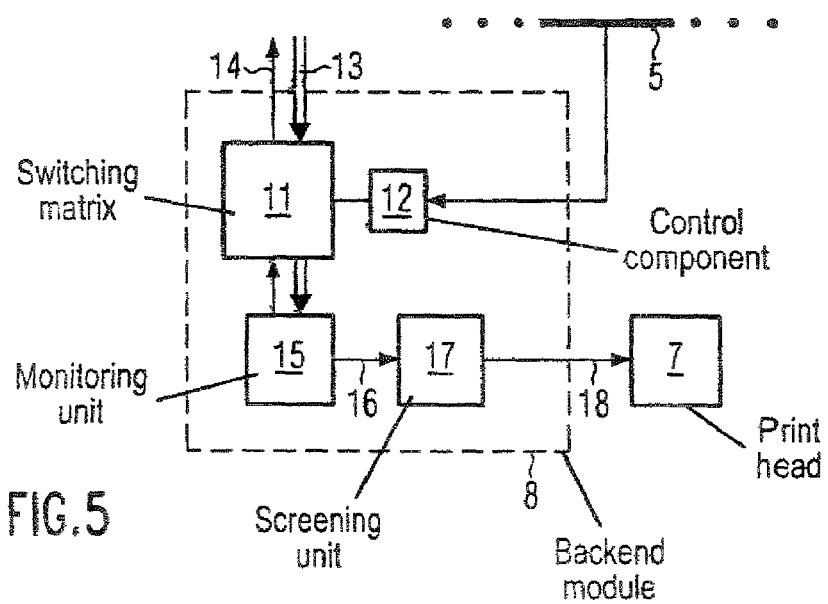
FIG. 5 illustrates schematically, the design of a backend module (shown in FIG. 2) that comprises a data connection to a print head.

The backend module (FIG. 5) comprises a monitoring unit 15 that can convert the signals from high-speed links into a parallel data signal that is placed on a 32-bit-wide parallel data bus 16 with which the signals are transferred to a screening unit 17 in which the signals are modified again before they are transferred to the print head 7 with a further parallel data bus 18. Data on the data buses 16, 18 can be transferred only from the monitoring unit 15 in the direction towards the print head 7/11. The monitoring unit 15 can monitor the data stream and provide feedback if applicable. The monitoring unit 15 is thus connected with the switching matrix 11 by means of four connections on which are present the signals of the four high-speed links of the serial data channels 13 and which are connected with a connection of the switching matrix 11 at which the signal of one of the high-speed links 14 that can be switched (FIG. 5).

In this control device the communication between the component modules 2, 3 and the communication between the component modules 2, 3 and the print head 7 occurs by means of a combination made up of a transfer of data over the parallel data bus 5 and a transfer of data over the serial high-speed connections. Since the switching matrix 11 is designed passive, the control component 12 is initially activated via the parallel data bus 5 such that it switches the switching matrix 11 to establish the desired connection via high-speed connections via which the data are then transferred.

Figure 3:
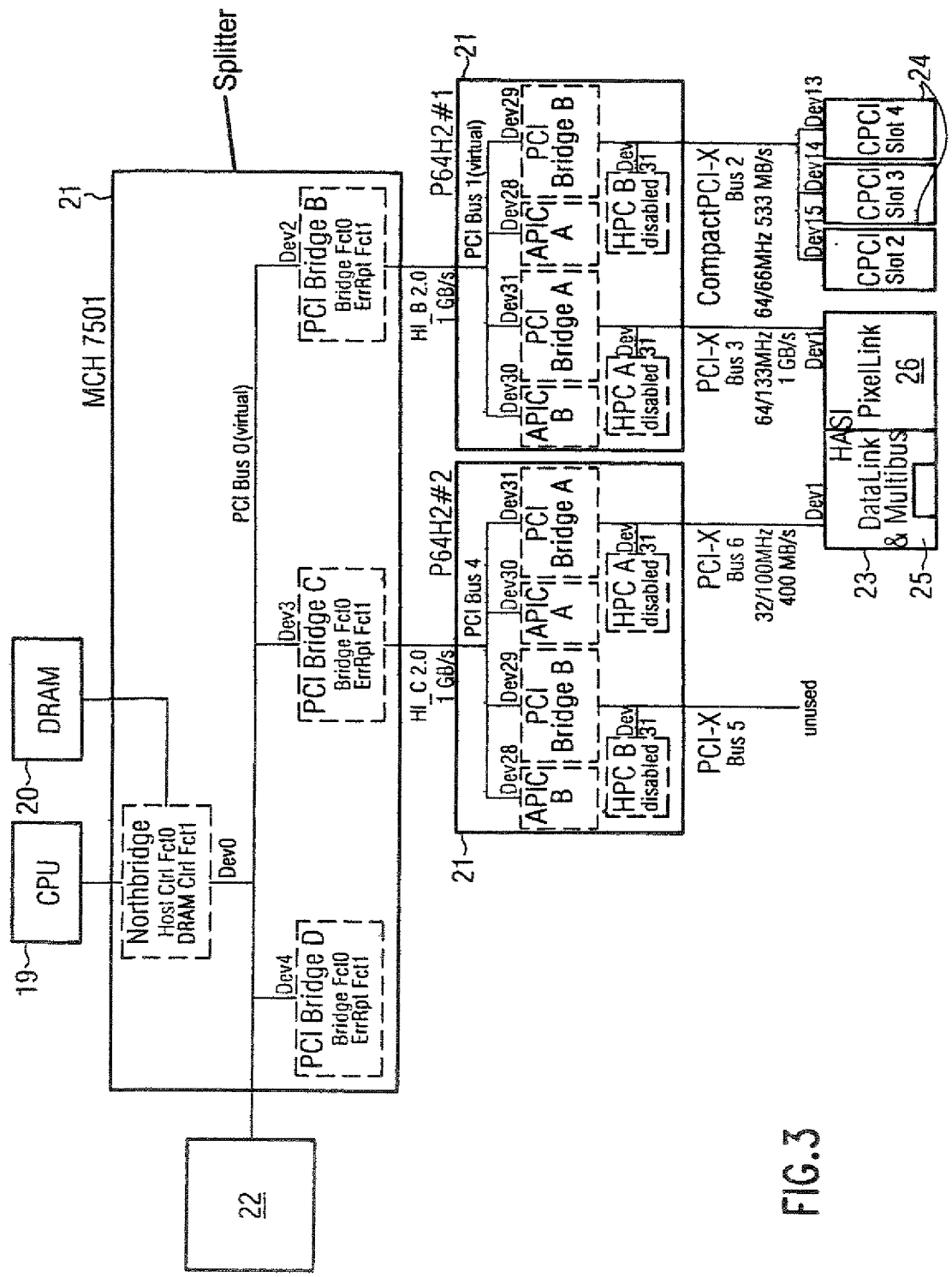
FIG. 3 illustrates schematically, the design of a module that can be used as an I/O module or raster module.

The design of a component module 2, 3 is schematically represented in FIG. 3 with regard to the communication structure. Such a component module 2, 3 comprises a central processing unit 19 (CPU), a memory 20 and three splitters 21 (hubs). The hubs are designated in FIG. 3 with MCH7501, P64H2#1 or P64H2#2. The hubs 21 connect the central processing unit 19 via a plurality of PCI-X buses with the peripherals 22, a host adapter serial interface (HASI) 23 and a plurality of plug connections 24 for contacting of a Compact PCI-X bus.

The HASI comprises two separate segments, namely a hybrid segment 25 and a pixel fine segment 26.

Figure 4:
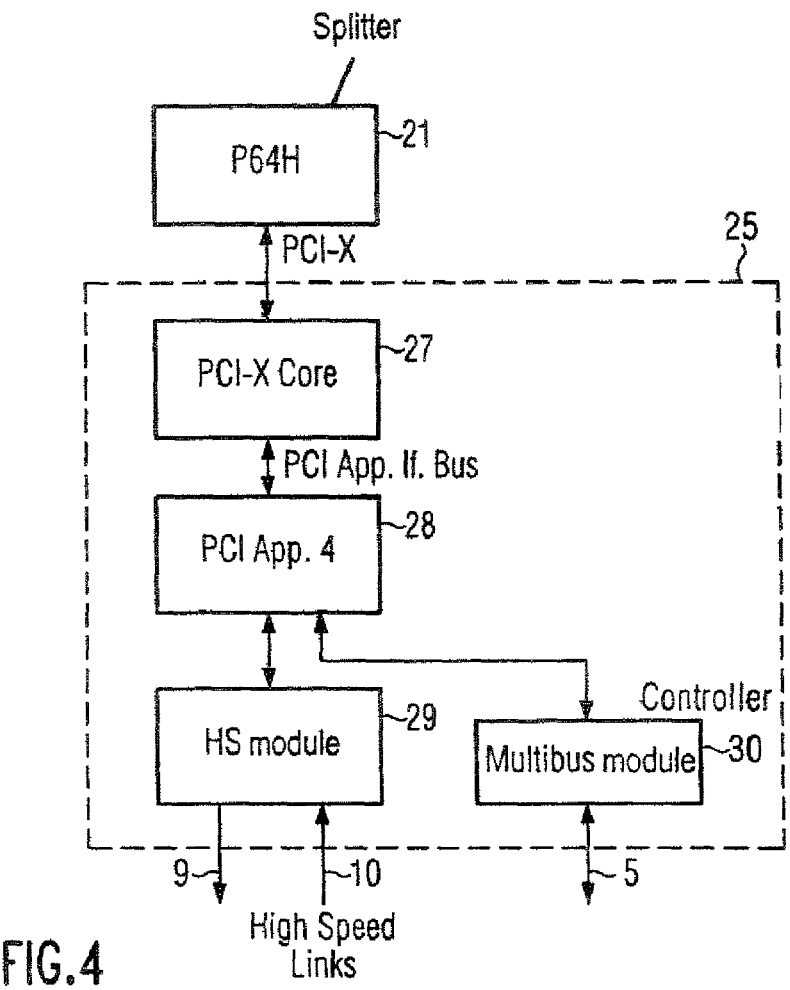
FIG. 4 shows schematically, the design of a data link & Multibus segment of a Host Adapter Serial Interface (HASI)

The design of the hybrid segment 25 is schematically represented in FIG. 4. The hybrid segment 24 comprises a PCI-X core 27, a PCI application interface 28, a HS module 29 (High Speed module) and a Multibus module 30.

The Multibus module 20 represents an interface with the Multibus 5. The HS module 29 is connected with respectively one high-speed link 9 for sending data and a high-speed link 10 for receiving data. The high speed module 29 and the Multibus module 20 are connected with one another and are connected with the PCI application interface 28 that comprises a DMA controller and a register controller interface for specification of registers in the HS module 29. The PCI application interface 28 is connected with the PCI-X core, which represents an interface module for the PCI-X bus via which the hybrid segment 25 is connected with one of the hubs 21.

The hybrid segment 25 is designated as a hybrid segment since, with the HS module 29, it possesses an interface with the serial high-speed links 9, 10 and, with the Multibus module 30, it possesses an interface with the parallel data bus 5 that is designed as a Multibus. The hybrid segment 25 thus allows a serial data transfer and a parallel data transfer.

The serial data channel 13 for transfer of data from the respective component module 2 to the backend module 8 and the high-speed link 14 for transfer of data from the backend module 8 to the respective component module 2, 3 are coupled to the pixel link segment 26. The pixel link segment 26 thus represents the interface of the respective component module 2, 3 with which the four high-speed links bundled into the serial data channel 13 are simultaneously used for transfer of data to the backend module.

So that a data transfer can occur over one of the high-speed connections 9, 10, 13, 14, the switching matrix 11 must be switched such that either two pairs of high-speed links 9, 10 of two different component modules 2, 3 are linked with one another or a serial data channel 13 and the corresponding high-speed link 14 are connected with the monitoring unit 15 that serves for communication with the print head 7.

The establishment and the dismantling of the data connection over the high-speed connections, an unsolicited message (unsolicited Multibus message) is used that is transferred over the data bus 5 that is designed a Multibus II. This message in principle comprises eight 32-bit words that are used only in part.

This unsolicited message is designated as a Connect Message. It is generated by the microcontroller 28 that would like to establish a high-speed data connection and is sent over the data bus 5 to the backend module 8 comprising the switching matrix 11. The connect message comprises a HW MSG header (Hardware Message) with which it is defined that the information within the backend module 8 that are contained in the connect message are relayed to the control component 12 in order to connect the inputs with the outputs of the switching matrix 11. This further information is two values pairs that respective specify the numbers of the inputs and outputs to be connected. Such a connect message thus comprises information in order to respectively switch connect the five channels of a high-speed connection.

Using an example of a transfer of data from a raster module S to the print head 7, it IS subsequently explained how such a high-speed data connection is established:

1. The raster module 3 generates a conned message that is transferred over the corresponding Multibus module 30 (to the Multibus 5) to the backend module 8 and is read there by the control component 12. The connect message comprises the information of which input of the switching matrix 11 is to be connected with which output.
2. The control component 12 switches the switching matrix 11 corresponding to the information comprised in the connect message and connects the serial data channel 13 with the connections leading to the monitoring unit 15 and connects the corresponding high-speed link 14 with the connection leading to the monitoring unit 15.

The data can now be transferred over the serial data channel 13. The transfer of the data occurs in the form of packets.

Figure 6:
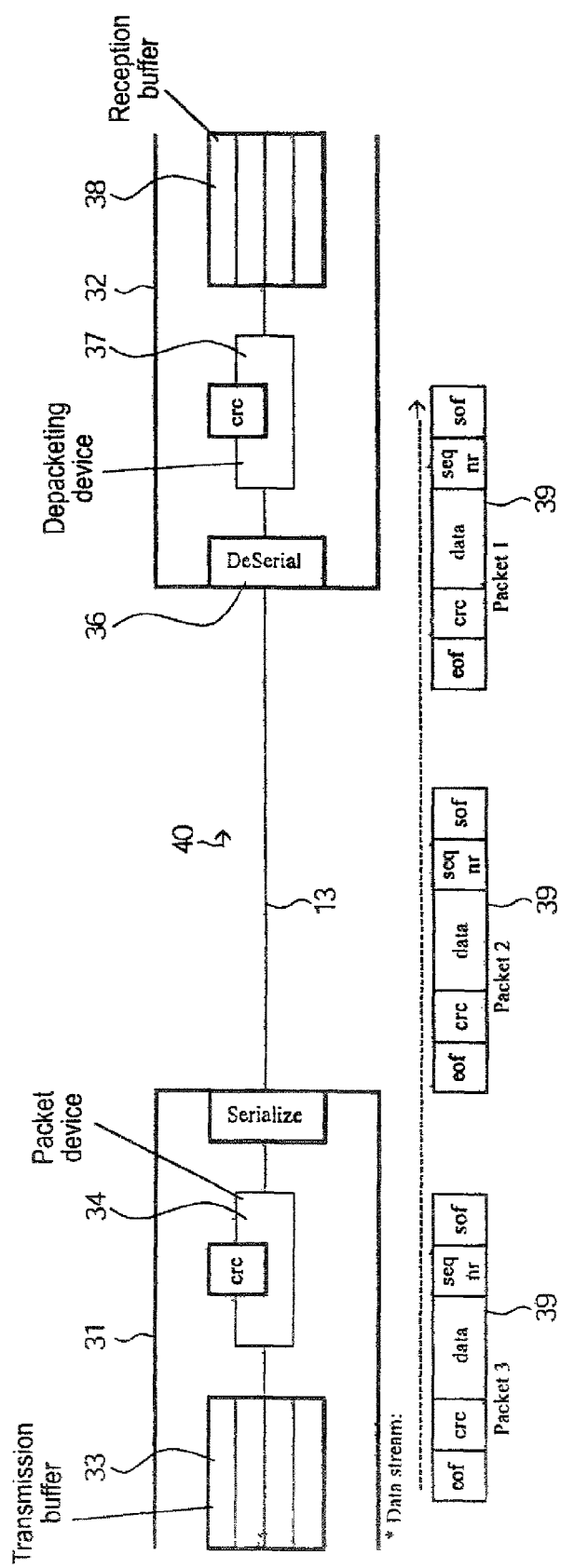
FIG. 6 shows a simplified schematic representation of a data connection between a sender and a receiver with a corresponding data stream in the form of packets.

For better explanation the sending component module 2, 3 is represented in FIG. 6 as a sender 31 and the receiving monitoring unit 15 is represented as a receiver 32. In this context it is emphasized that, although the preferred embodiment is preferably utilized with this control device, it is not limited to this control device but rather can be used between any arbitrary sender and receiver, in particular when the data are transferred between the sender and the receiver over a serial high-capacity data connection given which the danger of errors in the data transfer exists However, in principle the preferred embodiment can also be applied to a parallel data connection.

The sender 31 comprises a transmission buffer 31, a packeting device 34 (with which the data packets to be transferred are respectively combined into a packet) and a serializer 35 with which the packets are converted into a serial data stream and fed to a high-speed link of the serial data channel 13 or the high-speed link 14. The receiver 32 comprises a de-serializer 36 that converts the serial data into parallel data, a de-packeting device 37 that "unpacks" the packets, and a reception buffer 38.

The packets 39 are transferred in the direction from the sender to the receiver (arrow 40).

The packets 39 are comprised of 32-bit words. An SOF (Start of Frame) is arranged at the start of each packet and an EOF (End of Frame) is arranged at the end of each packet. These are specially-coded data words that mark the start or the end of a packet. They correspond to the known fiber channel specification.

A packet header follows the SOF, which packet header comprises the at least one sequence number that specifies the number of the packet in a predetermined sequence [order] of packets. This sequence number represents an identifier of the packet within the sequence of packets. The packet header can also comprise further information such as, for example, the packet type or an identification of the data contained in the packet. The data are arranged in packets following the packet header, whereby a data block is transferred with each packet. The data blocks typically have a uniform size that in the present exemplary embodiment is 2 Kbytes. The data block is terminated by a bock check code (CRC).

The packets 39 shown in FIG. 6 are data packets, i.e. packets that comprise a data block with usable data. In addition to the data packets there are also administration packets that are explained further below.

Before they are supplied from the receiver to the further processing, the data packets are checked for their completeness. This occurs using the block check code. Using the SOF and the EOF, a separate block check code is calculated for each packet and compared in the receiver 32 with the block check code transmitted with the packet. Faulty packets are discarded by the receiver 32 and possess no information content whatsoever for the receiver 32. Such arising gaps in the data stream should be detected by the receiver 32 and be compensated by the sender 31 as quickly as possible via a resending of the respective packet.

The problem is here not the detection of a faulty packet but rather its identification as quickly as possible.

The mere establishment of a block check code comparison error allows no conclusion of the identification of the packet since possible preceding packets cannot be detected as such at all based on incorrect SOF or incorrect EOF. In conventional methods a conclusion via number and identification of incorrectly-transferred packets is only possible when a valid packet is received again. The time span until the unambiguous identification of faulty packets is therefore dependent on (among other things) the number of successive defective packets as well as the pause between the packets. A dead situation can additionally occur given a completely filled transmission buffer 33 when none of the packets located in the transmission buffer 33 are acknowledged by the receiver 32.

Figure 7:
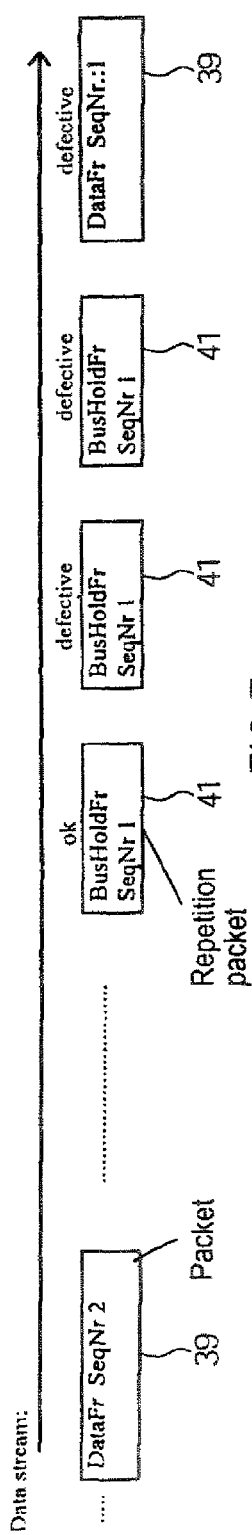
FIGS. 7 through 10 illustrate respective different data streams with and without repetition packets.

According to the preferred embodiment repetition packets 41 (FIG. 7) are transmitted to reduce or, respectively, avoid these problems. The repetition packets 41 of the data packets are also designated as bus holder frames. They differ from the corresponding data packets only in that the data block is missing. Otherwise the repetition packets 41 are identical to the corresponding data packet 39. They thus form very small packets whose information content is essentially limited to the identification of the preceding data packet. These repetition packets are likewise respectively delimited by an SOF and EOF and provided with a block confirmation code (CRC). The repetition packets that belong to the last sent data packet are sent from the sender 31 to the receiver 32 in pauses between the transmission of two successive data packets. Shown in FIG. 7 is a data stream with two data packets 39 with the sequence number 1 and the sequence number 2 between which is a considerable pause. A plurality of repetition packets 41 are generated by the sender 31 and sent to the receiver 32 in this pause between the two data packets 39 with the numbers 1 and 2. These repetition packets 41 coincide with the data packet 39 with the sequence number 1 in terms of SOF, the identifier, the block confirmation code and the EOF. They are thus associated with the data packet with the sequence number 1.

In the example shown in FIG. 7, the data packet 39 with the sequence number 1 and the first two repetition packets 41 are defective, meaning that the, cannot be read correctly by the receiver and therefore must be discarded entirely. Only the third repetition packet 41 can be received correctly by the receiver. The receiver reads from the identifier of the repetition packet 41 that the sequence number is 1 and thus establishes that the actual one data packet with the sequence number 1 should have been received. The receiver therefore dispatches to the sender a negative acknowledgement (which is explained in detail below) which induces the sender to resend the data packet again.

Via the sending of the repetition packets 41 it is avoided that the receiver must wait until the next complete and valid data packet has been transmitted or a timeout mechanism has initiated a resending of the data packet. Via the use of the repetition packets 41, the receiver can identify a faulty data packet significantly faster and initiate its retransmission.

Figure 8:
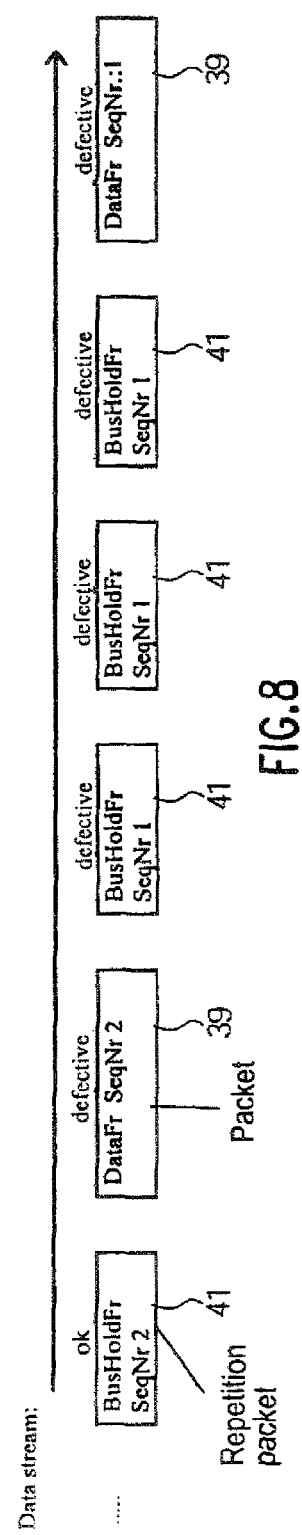

FIG. 8 shows a further data stream with two data packets 39 with the sequence numbers 1 and 2, whereby repetition packets 41 (bus holder frames with the sequence number 1) associated with the data packet are transferred in the pause between the two data packets 39 and, subsequent to the data packet with the sequence number 2, repetition packets 41 that belong to this data packet are transferred. In this example, both the two data packets 39 and also all repetition packets associated with the data packet 39 with the sequence number 1 are defective. The receiver receives the repetition packet that belongs to the data packet with the sequence number 2 (=bus holder frame with the sequence number 2) as a first valid packet. The receiver herein recognizes that it is missing the two data packets with the sequence numbers 1 and 2. Since the data packets are transmitted with a predetermined order (fixed ordering), in principle the lack of arbitrarily many data packets can be detected using one valid repetition packet.

In the examples shown above one sees that incorrectly-transmitted data packets can be identified more quickly via the transmission of repetition packets in the pauses or gaps between data packets, whereby the retransmission can correspondingly be requested more quickly. The effective data transfer rate is thus increased.

Figure 9:
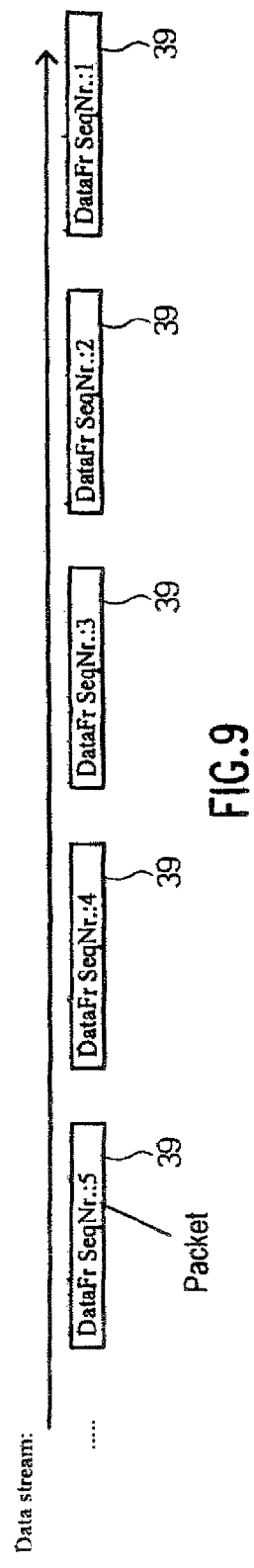

The use of repetition packets can even increase the efficiency of the data transfer when the bandwidth of the data connection is less than or equal to the effective required data bandwidth, meaning that the transmission buffer 33 is filled quicker than it is read out. Given such a state, in principle no gap exists between the individual data packets 39 (FIG. 9).

However, the transmission buffer 33 hardly possesses an infinite scope, meaning that only a specific maximum number of data blocks can be stored in the transmission buffer 33.

Furthermore, all data blocks are to be held in the transmission buffer until a positive acknowledgement by the receiver 32 to the transmitter 31 exists. In the event that as many data packets are now incorrectly transmitted as can be buffered in the transmission buffer 33, no further data packet can then be transmitted. Gaps thus arise again in the data stream, which gaps are in turn filled by repetition packets (FIG. 10).

Figure 10:
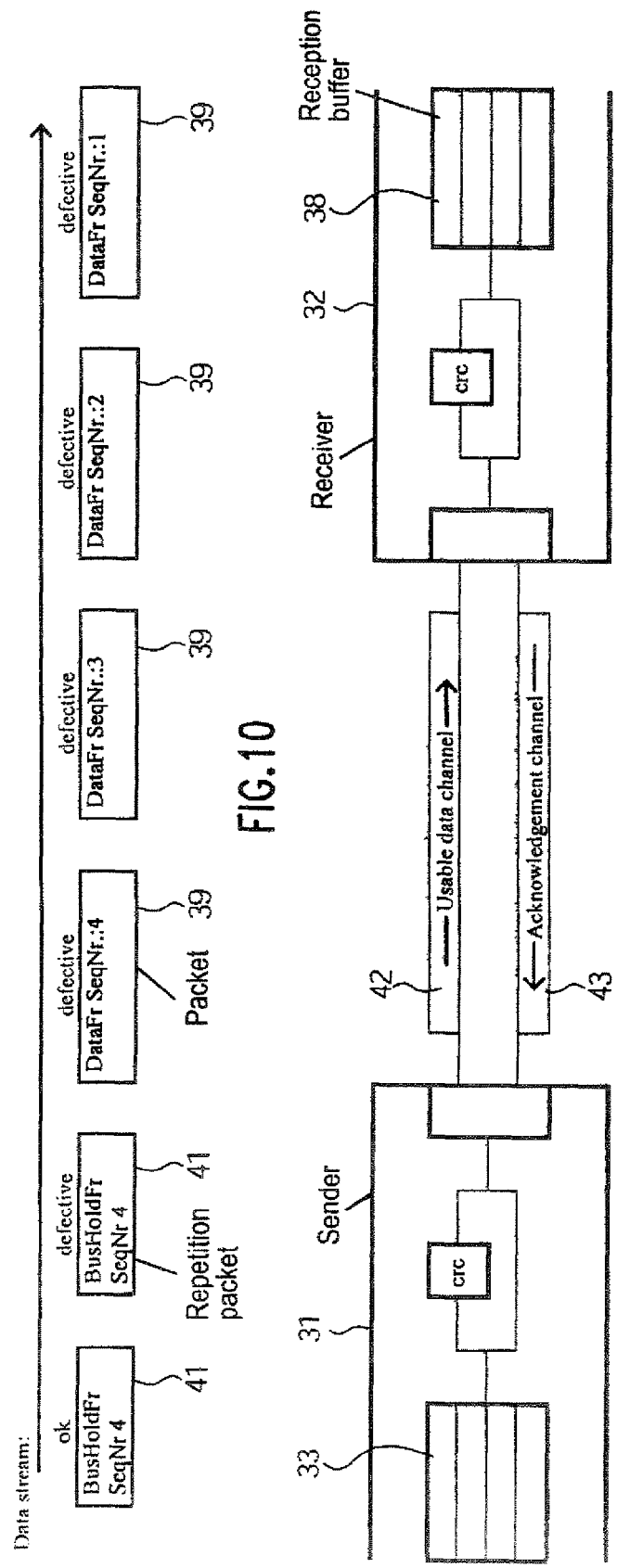

In the example shown in FIG. 10, the transmission buffer 33 can accept a maximum of 4 data blocks. All four corresponding data packets are transmitted incorrectly. No further data packets can thus be sent. The receipt of a valid repetition packet that corresponds to the last data packet to be transmitted and thus comprises the sequence number of 4 shows the receiver 32 that the data packets 1, 2, 3, 4 were transmitted incorrectly. This dead situation is remedied without a timeout mechanism.

Figure 11:
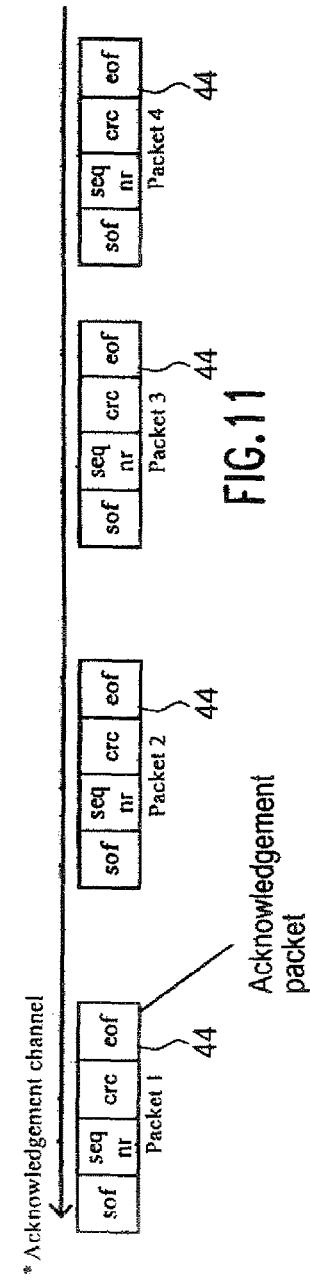
FIG. 11 illustrates a schematic simplified representation of a data connection with a usable data channel and an acknowledgement or channel between a sender and a receiver and the corresponding data stream on the acknowledgement channel.

At least one sender 31 and at least one receiver 32 are respectively arranged at the modules 2, 3 and the monitoring unit 15, such that a bidirectional data transfer is possible over the at least two serial data connections. This is shown schematically simplified in FIG. 11, whereby for simpler explanation of the preferred embodiment the left module in FIG. 11 is designated as a sender 31 and the right module in FIG. 11 is designated as a receiver 32. The data connection from the sender 31 to the receiver 32 is designated as a usable data channel 42 and the data connection from the receiver 32 to the sender 31 is designated as an acknowledgement channel 43.

Acknowledgement packets 44 with which the receiver 32 acknowledges to the sender 31 the proper receipt of data packets are transferred via the acknowledgement channel. The acknowledgement packets 44 are designed similar to the data packets, with an SOF, a packet header that comprises at least one sequence number, a block confirmation code (CRC) and an EOF.

The acknowledgement packets 44 are checked in the sender 31 for an error-free transfer. This occurs using the block check code that is transferred as well, which block check code is compared with a block check code calculated using the SOF and the EOF. Faulty acknowledgement packets are discarded. Such gaps arising in the acknowledgement of data packets are inferred via subsequent acknowledgements received without error. For example, if the acknowledgements for the data packets 1 and 2 are lost, the transmission buffer 33 is also automatically approved or released for the packets 1 and 2 with the error-free receipt of the acknowledgement for the data packet 3.

Two fundamental problems result given conventional methods:
1. If the time intervals between two acknowledgement packets are very large, it can then occur that an actual segment of the transmission buffer 33 to be released are [sic] only released with the receipt of an acknowledgement packet of a subsequent data packet that arrives a great deal later. The corresponding segment of the transmission buffer 33 is hereby blocked for an unnecessarily long period.
2. If the transmission buffer 33 is filled completely and all acknowledgement packets are faulty, a timeout mechanism must be engaged in order to prevent a dead state.

Both problems can be avoided via the use of repetition packets 41 on the acknowledgement channel 43.

The repetition packets 41 correspond to the acknowledgement packets 44 and comprise at least the same identifier (sequence number) as the acknowledgement packets with which they are associated. The repetition packets 41 are advantageously identical to the respective acknowledgement packets 44.

The repetition packets 41 that are associated with the already-sent acknowledgement packets are transmitted in the pause or in the gap between two acknowledgement packets.

Figure 12:
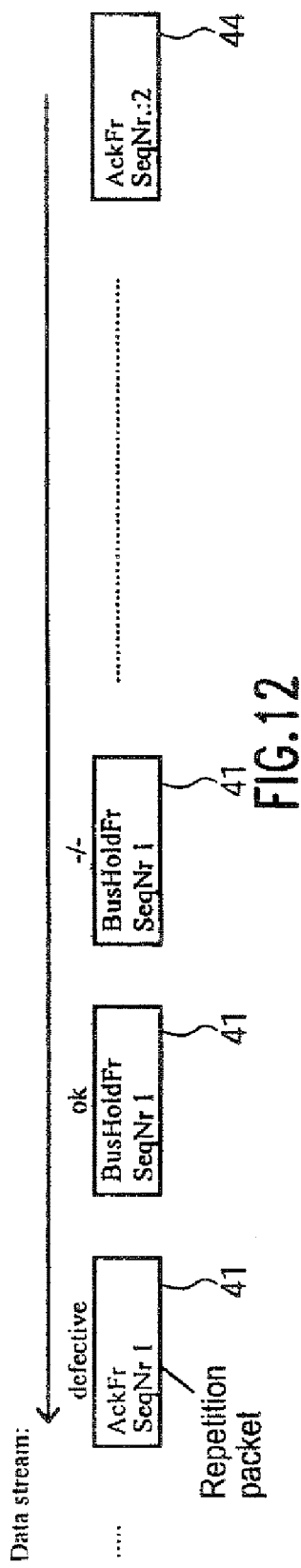
FIGS. 12 and 13 show a data stream on the acknowledgement channel with repetition packets.

FIG. 12 shows an example in which an acquisition packet 44 with the sequence number 1 is defective and the repetition packet 41 following first after the acquisition packet 44 is correctly recognized by the sender. The sender thus recognizes without significant time delay that the data packet with the sequence number 1 was correctly received by the receiver 32 and releases the corresponding memory segment in the transmission buffer 33. The further repetition packets 41 are ignored by the sender.

Without the use of the repetition packets 41, the buffer segment of the transmission buffer 33 that contains the data block for the data packet with the sequence number 1 would be blocked until the next acknowledgement packet was received without error. The utilization of the repetition packets 41 thus accelerates the release of the memory segments.

Figure 13:
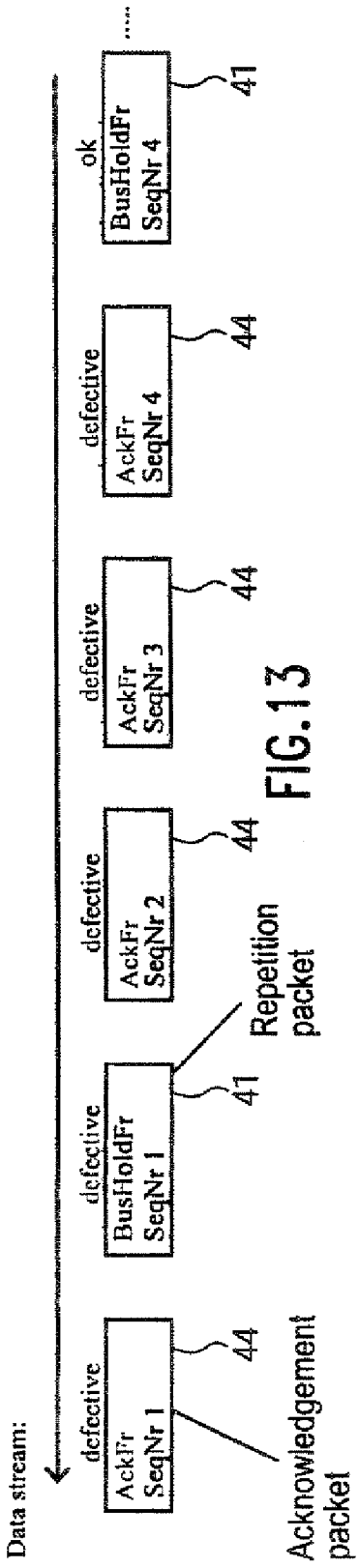

FIG. 13 shows an example in which four acknowledgement packets 44 with the sequence numbers 1, 2, 3, 4 and repetition packets 41 in-between these are defective and are not recognized by the sender. In this example the transmission buffer 33 can accommodate only four data blocks. The four memory segments of the transmission buffer 33 are therefore not released. They are only released when the sender receives a repetition packet 41 regarding the last acknowledgement packet 44 that comprises the sequence number 4. A dead state on the acknowledgement channel 43 due to a release of the buffer segments prevented for lack of correctly received acknowledgement packets can thus also be avoided with the repetition packet 41.

In prototypes the application has additionally shown that the effective data rate or effective bandwidth could be significantly increased via the use of the repetition packets given a serial high-capacity data connection. This is to be ascribed to the fact that the timeout mechanism is in practice no longer used in normal operation.

The timeout mechanism can be entirely omitted both for the usable data channel 42 and for the acknowledgement channel 43 when a mechanism is present with which a physically-defective connection can be detected. Such a mechanism is, for example, the "loss-of-sync flag".

The use of repetition packets has been explained above with regard to the safeguarding of administration packets, namely acknowledgement packets. In a development of the method of the preferred embodiment a differentiation is made between two types of acknowledgement packets, the positive acknowledgement packets (Ack=acknowledged) and the negative acknowledgement packets (Nack=not acknowledged).

From conventional methods it is already known to use positive and negative acknowledgement packets. Upon receipt of a positive acknowledgement packet the sender releases the corresponding buffer segment of the transmission buffer; to the contrary, upon receipt of a negative acknowledgement packet it executes a retransmission of the corresponding data block by means of a data packet.

As is already explained above, the data transfer rate can be increased via use of repetition packets that are transmitted on the usable data channel and are associated with the data packets.

However, similar problems also exist on the acknowledgement channel since a faulty negative acknowledgement packet can lead to the situation that the retransmission of the corresponding data block is not executed and the receiver waits forever for the corresponding data packet. In conventional methods this dead state is trapped or intercepted via the timeout mechanism, which is not very effective.

A similar problem arises when the sender does in fact correctly receive the negative acknowledgement packet but the data packet already lost once newly exhibits an error and can again not be correctly received by the receiver. Here as well the receiver waits for the data packet to be sent again until the timeout mechanism ends this dead state.

These problems are solved via use of repetition packets 41/1 for data packets as well as the use of the repetition packets 41/2 for the negative acknowledgement packets, whereby in both types of repetition packets 4111 and 4112 a retransmission flag is respectively provided that can respectively assume the state 1 or 0.

The repetition packets 4111 associated with the data packets correspond to the repetition packets 41 explained by FIG. 7, whereby they have merely been supplemented by the retransmission flag. The repetition packets 41/2 that are associated with the negative acknowledgement packets are identical to the respective negative acknowledgement packets, Via the use of the retransmission flag a type of handshake mechanism is realized on the packet plane, which handshake mechanism is explained using the examples shown in FIGS. 14 through 17.

Figure 14:
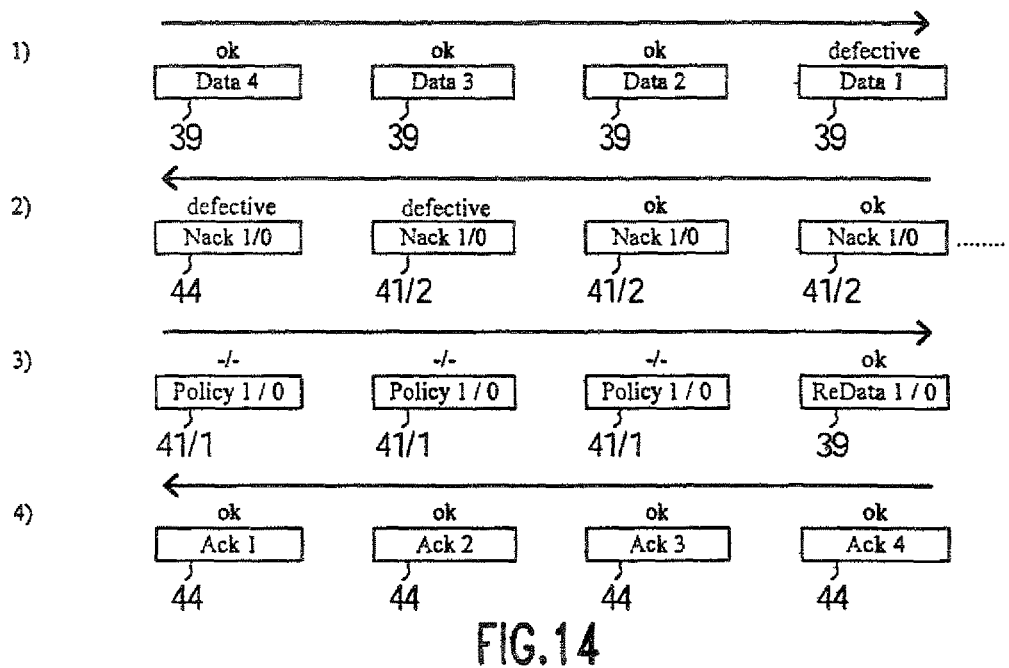
FIGS. 14 through 17 illustrate examples of different sequences of the data streams on the data connection with the usable data channel and the acknowledgement channel according to FIG. 11.

FIG. 14 shows a data stream on the usable data channel 42 with which four data packets 1, 2, 3, 4 are transferred, whereby the data packet with the sequence number 1 is defective.

Upon receipt of the data packet with the sequence number 2, the receiver recognizes that it is missing the data packet 39 with the sequence number 1 and generates a negative acknowledgement packet with the sequence number 1. The negative acknowledgement packet and corresponding repetition packets 41/2 are transmitted to the sender via the acknowledgement channel 42. The acknowledgement packet and the first repetition packet 41/2 are defective. However, the sender receives the second repetition packet 41/2 and generates a re-data packet with the sequence number 1 and the retransmission flag 0. This data packet is properly received by the receiver and acknowledged via positive acknowledgement packets 44 with the sequence numbers 1, 2, 3, 4. The data transfer of the four data packets 1, 2, 3, 4 is thus concluded.

Figure 15:
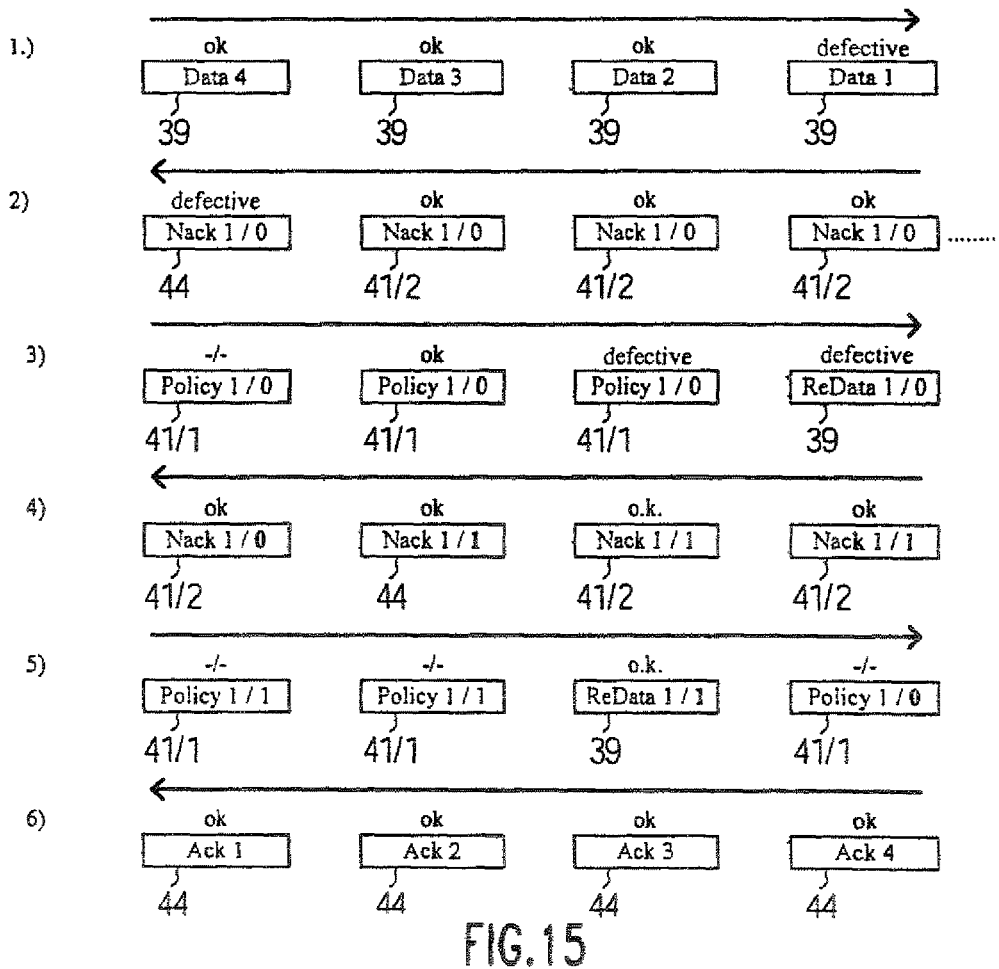

FIG. 15 shows an example similar to FIG. 14, whereby here however the receipt of the re-data packet with the sequence number 1 and the retransmission flag 0 is not corrected Since repetition packets 41/1 with the sequence number 1 that correspond to this re-data packet and the retransmission flag 0 are sent afterwards (line 3 in FIG. 15), the receiver detects that it should have received a resent data packet with the sequence number 1 and the retransmission flag 0.

The receiver newly generates a negative acknowledgement packet with the sequence number 1, however with an inverted retransmission flag that now comprises the value 1 (line 4 in FIG. 15). Corresponding repetition packets 41/2 are also generated and transferred over the acknowledgement channel 43. Using the altered retransmission flag the sender recognizes that a new negative acknowledgement packet regarding the data packet with the sequence number 1 exists, such that it retransmits the re-data packet with the sequence number 1. However, this time the inverted retransmission flag of the negative acknowledgement packets 41/2 is adopted in the re-data packet 39, whereupon it exhibits the value 1. The same correspondingly applies for the corresponding repetition packets 41/1 (line 5 in FIG. 15).

This re-data packet with the sequence number 1 is now correctly received, whereupon the receipt of the data packets 1, 2, 3, 4 with positive acknowledgement packets 1, 2, 3, 4 is confirmed (line 6 in FIG. 15).

Via the provision of a retransmission flag both the sender and the receiver can establish whether the corresponding packets are current when the value of the flag has changed or are not to be considered when the flag exhibits the same value as the flag of a corresponding, already correctly received packet. It is thus avoided that the repetition packets lead to ambiguities.

Figure 16:
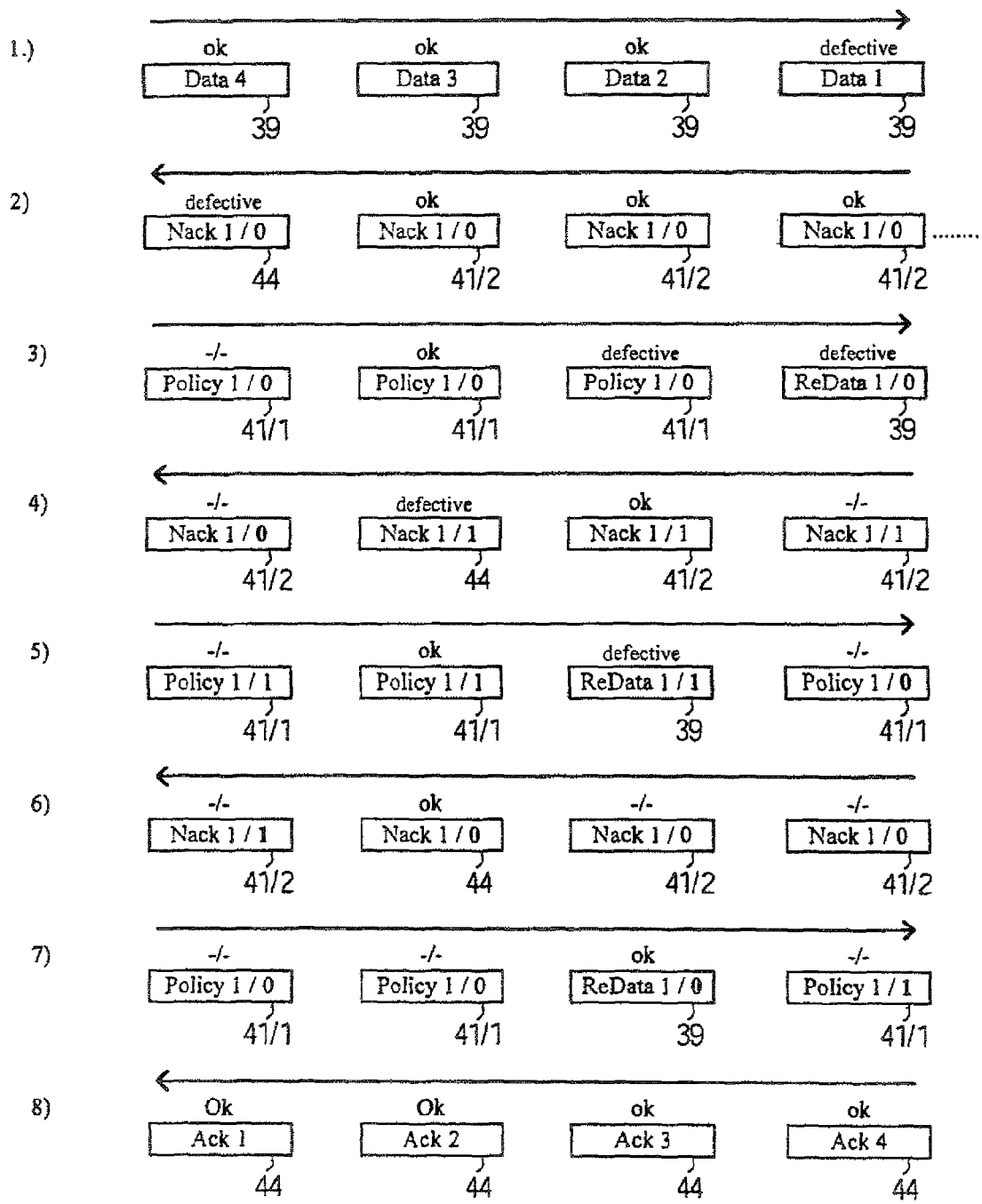

The example shown in FIG. 16 differs from the example shown in FIG. 15 since the re-data packet 39 re-sent for a second time with the sequence number 1 (whose retransmission flag now comprises the value 1) is defective (line 5 in FIG. 16). This re-data packet can thus again not be received by the receiver.

After the receipt of the corresponding repetition packet 41/1 with the sequence number 1 and the retransmission flag 1, the receiver generates a further negative acknowledgement packet 44 with newly-inverted retransmission flag that now comprises the value 0 (line 6 in FIG. 16). Corresponding repetition packets 41/2 are also generated and transferred over the acknowledgement channel 43.

Using this negative acknowledgement packet 44 with newly inverted flag the sender recognizes that the second retransmission of the data packet 39 with the sequence number 1 has also not been transmitted correctly and a retransmission of the re-data packet 39 with the sequence number 1 and with newly inverted retransmission flag (which now has the value 0) must be executed for a third time. Corresponding repetition packets 41/1 are generated if this re-data packet 39 is received correctly, the receipt of the data packets 1, 2, 3, 4 is confirmed via corresponding acknowledgement packets 1, 2, 3, 4 (line 8 in FIG. 16).

Via the provision of the retransmission flag, in principle a resending of a data packet can be initiated at the sender arbitrarily often since the sender can associate the acknowledgement packets or their repetition packets with the respective preceding data packets via the change in the retransmission flag. The retransmission of the data packets is initiated without delay via the use of the repetition packets, whereupon a high date transfer rate is achieved The example shown in FIG. 17 differs from the preceding examples in that two data packets 39 are defective, namely the data packet with the sequence number 1 and the data packet with the sequence number 3. The data packet with the sequence number 2 following the data packet with the sequence number 1 and the data packet with the sequence number 4 following the data packet with the sequence number 3 are correctly received, whereupon the receiver recognizes that the data packets with the sequence number 1 and the sequence number 3 have not been correctly received.

Figure 17:
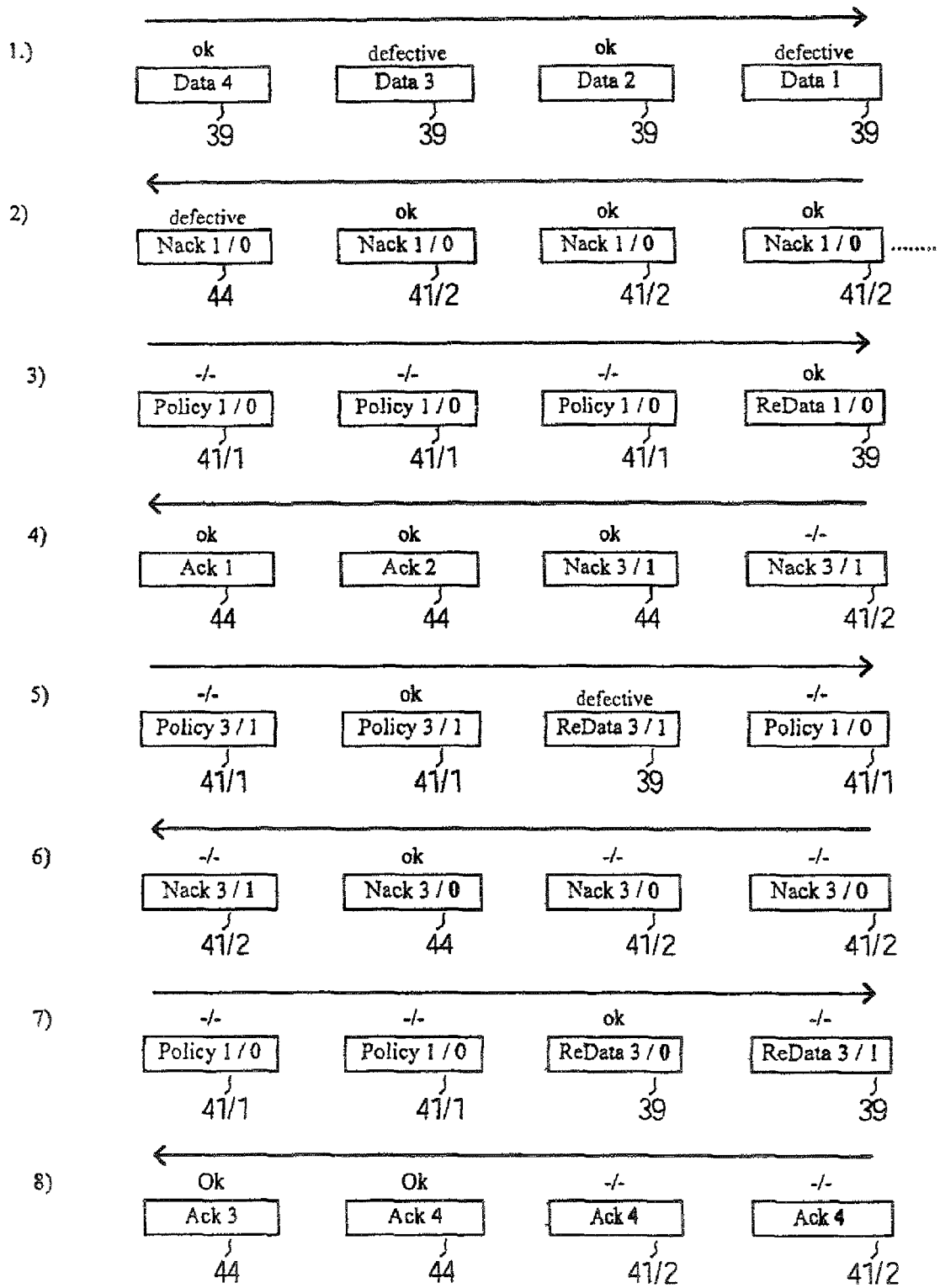

A negative acknowledgement packet for the incorrect data packet with the lowest sequence number (thus with the sequence number 1) and the retransmission flag 0 and corresponding repetition packets 41/2 are initially generated (line 2 in FIG. 17).

The sender hereupon generates a re-data packet 39 with the sequence number I and the retransmission flag 0 and corresponding repetition packets 41/1 (line 3 in FIG. 17).

This re-data packet with the sequence number 1 is correctly received by the receiver, whereupon this receiver confirms the receipt of the data packets with the sequence numbers 1 and 2 with two positive acknowledgement packets 44 and, immediately following this, indicates the faulty receipt of the data packet with the sequence number 3 with a negative acknowledgement packet 44 and corresponding repetition packets 41/2 (line 4 in FIG. 17). The sender now generates a re-data packet 39 with the sequence number 3 whose retransmission flag comprises the same value as the flag of the negative acknowledgement packet 44 just receive Corresponding repetition packets 41/1 are sent after the re-data packet (line 5 in FIG. 17).

If the re-data packet 39 with the sequence number 3 is again defective, a negative acknowledgement packet 44 with the sequence number 3 is generated again, the retransmission flag of which negative acknowledgement packet 44 has been inverted and comprises the value 0. Corresponding repetition packets 41/2 are generated (line 6 in FIG. 17).

The re-data packet with the sequence number 3 is now dispatched again by the sender. However, its retransmission flag now comprises the value 0. Corresponding repetition packets 41/1 are generated (line 7 in FIG. 17). If this re-data packet 39 with the sequence number 3 is correctly received, the sender also confirms the receipt of the data packets with the sequence numbers 3 and 4 with positive acknowledgement packets 44 (line 8 in FIG. 17).

The examples explained above show that a retransfer of the data packets is initiated quickly with the simple mechanism of the repetition of data and administration packets (=negative and/or positive acknowledgement packets) and the provision of the retransmission flag that is inverted upon generation of a negative acknowledgement packet due to the faulty receipt of a negative acknowledgement packet. It also does not matter whether the error occurs in a data packet or in a negative acknowledgement packet. When repetition packets are also provided with regard to the positive acknowledgement packets, an error occurring in a positive acknowledgement packet can thus also be remedied quickly and the corresponding buffer segment in the transmission buffer can be released.

The preferred embodiment can be summarized briefly as follows:

The preferred embodiment concerns a method and a device for transfer of data over a data connection from the sender to a receiver by means of packets.

Repetition packets regarding predetermined packets are transmitted given free transfer capacity. The packets and their corresponding repetition packets comprise an identifier using which the receiver can identify the packets. Given a faulty transfer of a packet, the receiver can identify this quickly via the provision of the repetition packets and can introduce corresponding countermeasures.

This method is in particular provided for serial high-capacity data connections in which a faulty transfer of individual packets cannot be precluded in principle.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for transfer of data over a data connection from a transmitter to a receiver by use of data packets that each comprise an identifier and by use of said identifier the receiver can identify a respective data packet, comprising the steps of:
    given a free transfer capacity of the data connection, transferring with the transmitter a plurality of data packets and for each transferred data packet also transferring directly following each data packet in a pause between adjacent data packets at least one respective repetition packet, said respective repetition packet comprising an identifier of the respective transferred data packet, the transferred data packets each comprising useable data in a respective data block, and the repetition packets having no data blocks with said useable data of the respective transferred data block and are thus substantially shorter than the respective transferred data block; and
    with the receiver entirely discarding incorrectly received data packets and incorrectly received repetition packets, and, given a faulty transfer of a respective data packet, identifying the faulty transferred data packet using the identifier of the faulty transferred data packet in the respective repetition packets.

2. The method according to claim 1 wherein the transferred data packets are transferred in a predetermined order and the identifier of the respective data packet specifies a place of the respective data packet in the predetermined order.

3. The method according to claim 1 wherein the receiver requests retransmission of an incorrectly received data packet at the transmitter after identification of the incorrectly received data packet.

4. The method according to claim 3 wherein said retransmission of the incorrectly received data packet is requested by means of an administration packet comprising a negative acknowledgment packet.

5. The method according to claim 4 wherein at least one respective acknowledgement repetition packet is transmitted associated with and following the respective negative acknowledgment package wherein said acknowledgment repetition packet is identical to the respective negative acknowledgement packet.

6. The method according to claim 4 wherein the administration packet can also comprise a positive acknowledgement packet confirming receipt of a specific data packet by the receiver.

7. The method according to claim 1 wherein said data connection comprises a useable data channel from said transmitter to said receiver, and wherein an acknowledgment channel is also provided from said receiver to said transmitter, said acknowledgement channel transferring administration packets from said transmitter to said receiver, said administration packets comprising positive or negative acknowledgement packets with which a positive or a negative receipt of a specific data packet by the receiver is confirmed to the transmitter, and wherein at least one respective acknowledgment repetition packet follows a respective negative acknowledgement packet, said acknowledgment repetition packet being identical to said respective negative acknowledgment packet.

8. The method according to claim 7 wherein a respective acknowledgement repetition packet follows a respective positive acknowledgement packet.

9. The method according to claim 5 wherein a plurality of said respective acknowledgment repetition packets are provided following the respective negative acknowledgement packet.

10. The method according to claim 5 wherein the negative acknowledgement packet and the respective following acknowledgment repetition packet each comprise a flag.

11. The method according to claim 10 wherein the transmitter, upon resending of a data packet after receipt of said negative acknowledgement packet or said respective acknowledgment repetition packet following said respective negative acknowledgement packet, incorporates the flag in the negative acknowledgement packet or in the corresponding acknowledgment repetition packet into the corresponding data packet to be resent.

12. The method according to claim 1 wherein the data transfer occurs over a serial data connection.

13. The method according to claim 12 wherein the serial data connection used is compatible with a Rocket IO transceiver.

14. The method according to claim 1 wherein no time out mechanism is used.

15. A system for transfer of data, comprising:
- a transmitter and a receiver with a data connection therebetween, and said transmitter transferring over said data connection data packets that each comprise an identifier and by use of said identifier the receiver identifies a respective data packet;
- said transmitter, given a free transfer capacity of the data connection, transferring a plurality of data packets and for each transferred data packet also transferring directly following each data packet in a pause between adjacent data packets at least one respective repetition packet, said respective repetition packet comprising an identifier of the respective transferred data packet, the transferred data packets each comprising useable data in a respective data block, and the repetition packets having no data blocks with said useable data of the respective transferred data block and are thus substantially shorter than the respective transferred data block; and
- the receiver entirely discarding incorrectly received data packets and incorrectly received repetition packets, and, given a faulty transfer of a respective data packet, identifying the faulty transferred data packet using the identifier of the faulty transferred data packet in the respective repetition packets.

16. The device according to claim 15 wherein the data connection comprises a plurality of data channels.

17. The device according to claim 15 wherein the data connection comprises both a parallel data bus and serial high-speed connection, the serial high-speed connection being switched by use of a passive switching matrix controlled by a control component activated by messages transferred over the parallel data bus for switching of the switching matrix.

18. The device according to claim 15 wherein the device comprises a component of a high capacity printer.

* * * * *